Nov. 24, 1970  E. W. ANDERSON  3,541,853
NAVIGATION APPARATUS
Filed June 30, 1967  4 Sheets-Sheet 3
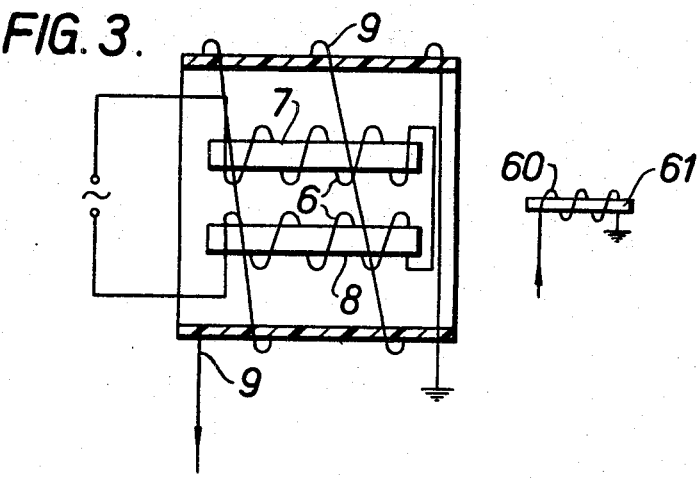
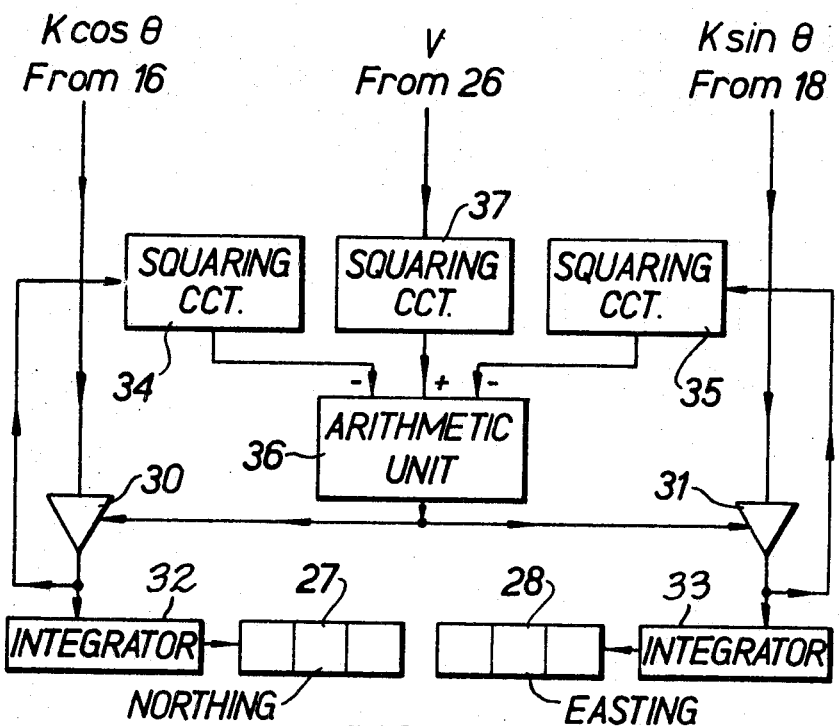
EDWARD WILLIAM ANDERSON
—Inventor
Hall, Pollock + Vande Sande.
—Attorneys

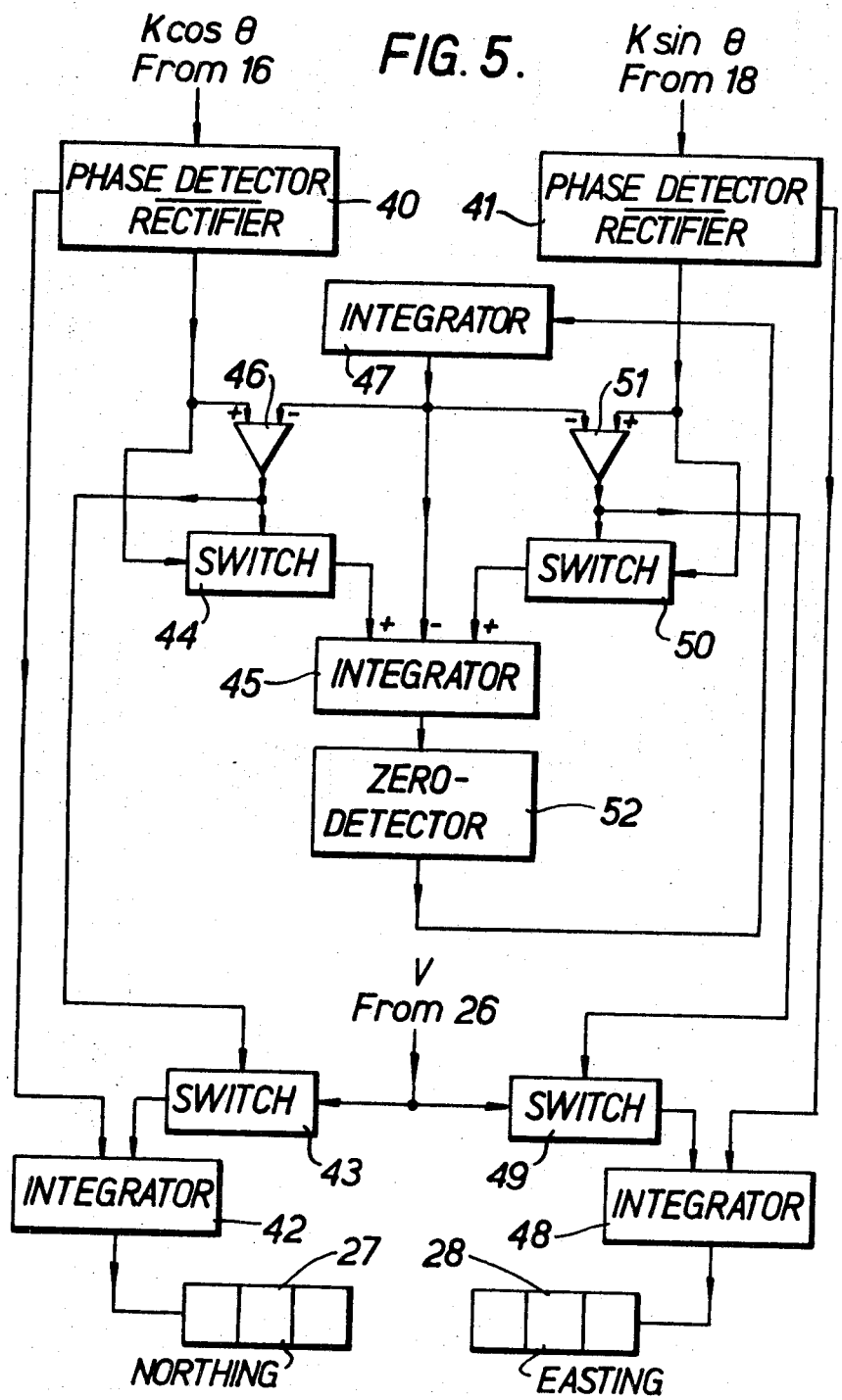

United States Patent Office 3,541,853
Patented Nov. 24, 1970

---

3,541,853
NAVIGATION APPARATUS
Edward William Anderson, Prestbury, Cheltenham, England, assignor to Smiths Industries Limited, London, England, a British company
Filed June 30, 1967, Ser. No. 650,544
Claims priority, application Great Britain, July 7, 1966, 30,577/66
Int. Cl. G01c 21/00, 17/38
U.S. Cl. 73—178                                12 Claims

ABSTRACT OF THE DISCLOSURE

Craft navigation apparatus includes two flux-valve detectors that sense fore-aft and athwartships components of the earth's magnetic field at different distances from the craft. Fractionally-weighted values of the components sensed by the detector nearest the craft are subtracted from their corresponding component-values sensed by the other detector to derive component-values corrected for the craft-produced magnetic-deviation. These values, before use to indicate craft-heading and compute northing and easting of the craft, are corrected for local magnetic-variation by combining with a fraction of each, a pre-selected fraction of the other.

---

This invention relates to navigation apparatus.

The invention is particularly concerned with apparatus of the kind for use in the navigation of a craft (which may be a land-, air-, or sea-craft) by reference to the earth's magnetic field.

With navigation apparatus of the latter kind it is necessary to take into account the magnetic deviation arising from the modification of the earth's magnetic field locally of the craft, such modification being due to the ferromagnetic and, in general, partially magnetic content of the craft. Forms of navigation apparatus already known in this respect are described in British patent specification Nos. 775,440 and 853,942, and U.S. patent specification No. 2,900,736.

It is an object of the present invention to provide navigation apparatus of improved form compared with these known forms.

According to the present invention navigation apparatus for use with a craft includes a pluarlity of spaced magnetic detectors, for example pairs of flux-valve devices, for sensing respectively at different locations relative to the craft the earth's magnetic field as differently modified at those locations by the craft. The apparatus also includes, means for deriving from each detector at least two singals that are in accordance respectively with different components of the field sensed by the individual detector, a first of the two signals being derived in each case in accordance with the component of field parallel to a first of two mutually-inclined axes, for example the fore-aft and athwartships axes of the craft, and the second signal being derived in each case in accordance with the component of field parallel to the second axis. The first signals derived from the detectors are compared with one another to provide an output representation in accordance with the component of undeviated field along said first axis. Similarly the second signals derived from the different detectors are compared with one another so as to provide an output representation in accordance with the component of undeviated field along said second axis.

The navigation apparatus of the present invention, as compared with the known forms of apparatus referred to above, has the advantage that the said output representations are related to defined axes and are provided simply by comparison of signals that are derived in relation to those axes, from the magnetic detectors. No bulky servo systems are necessarily involved and the apparatus readily lends itself to provision in a compact and lightweight form taking advantage of present-day economical production-techniques for electrical circuits. Furthermore, the output representations are in a form that readily allows for correction for local magnetic-variation and computation, for example, of the distance travelled by the craft in terms of northing and easting.

The spaced magnetic detectors, of which there may be just two, may be carried by a non-ferromagnetic boom that is adapted to project from the craft, and the said first and second axes may be mutually-perpendicular axes.

The navigation apparatus may be readily used to indicate the distances travelled by the craft in terms of northing and easting. The computing involves in each case simply the integration with respect to time of the product of the craft-velocity and the appropriate output representation of undeviated-field component.

Navigation apparatus in accordance with the present invention will now be described, by way of example, with reference to the accompanying drawings, in which:

FIG. 3 shows the form of a magnetic flux-valve device used in the navigation apparatus;

FIG. 4 is a schematic representation of a computer used in the navigation apparatus; and FIG. 5 is a schematic representation of an alternative form of the computer.

The navigation apparatus in the present instance will be described as provided on a land-craft, for example a military land-vehicle, but the apparatus is equally applicable to other forms of craft. The whole electrical circuit of the apparatus can readily be provided in compact and lightweight form using solid-state components and micro-miniaturization techniques.

Figure 1:
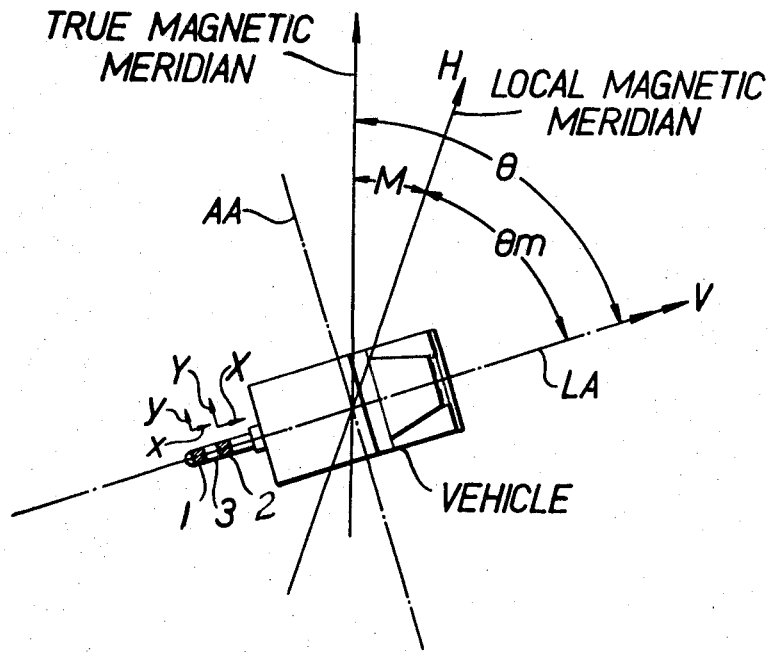
FIG. 1 is a plan view of a craft carrying the navigation apparatus.
Figure 2:
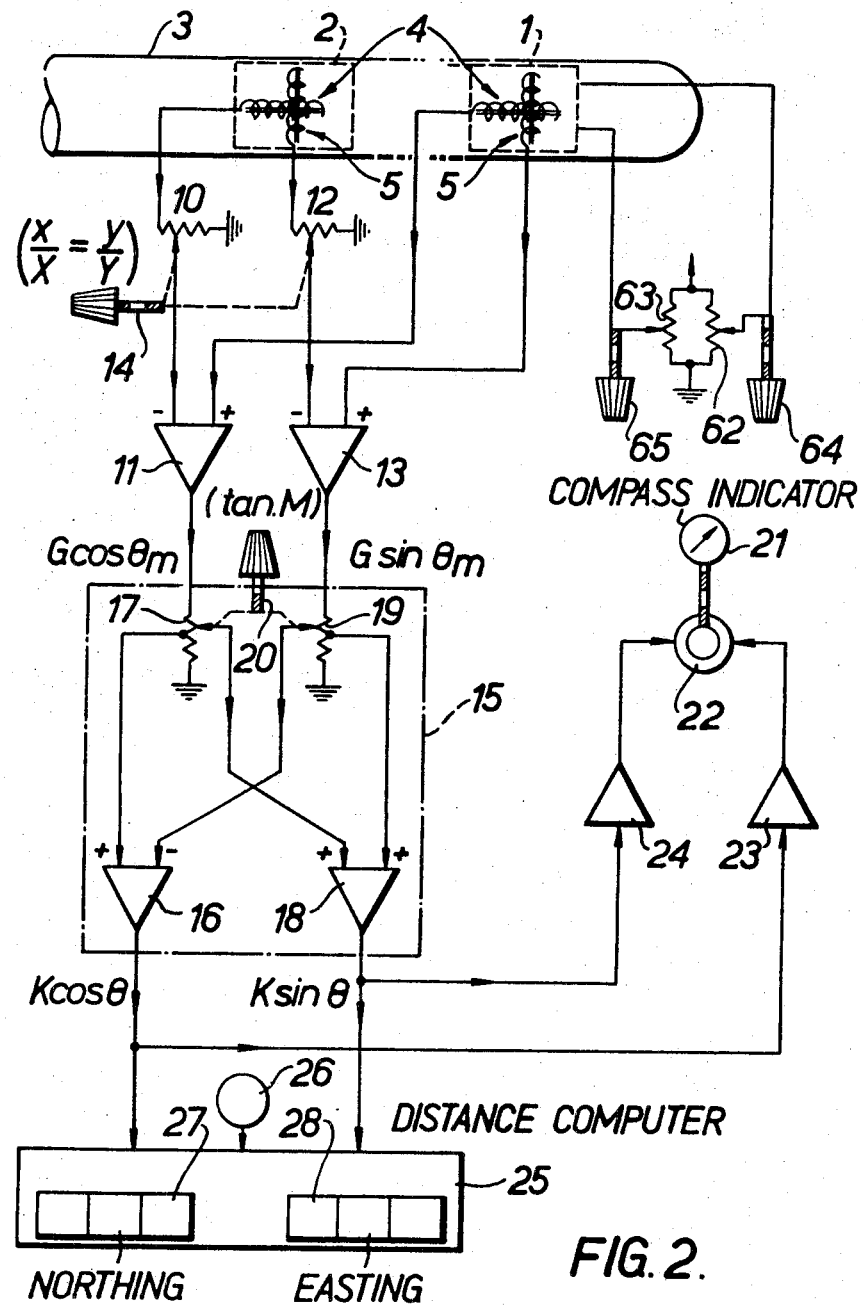
FIG. 2 is a schematic representation of the navigation apparatus.

Referring to FIGS. 1 and 2, two magnetic detector units 1 and 2 are carried on a non-ferromagnetic boom 3 that projects from the vehicle by a short distance; the boom 3 may be, for example, of aluminum and project rearwardly of the vehicle by a distance less than four feet. The detector unit 1 is mounted at the far end of the boom 3, whereas the detector unit 2 is mounted nearer to the vehicle at an intermediate point along the length of the boom 3. The exact location of the detector unit 2 along the boom 3 may be, in this context, chosen such that the magnetic effect of the vehicle as experienced by the detector unit 2, is about double that as experienced by the detector unit 1 at the far end.

Each detector unit 1 and 2 comprises two flux-valve devices 4 and 5 for sensing magnetic-field strengths in mutually-perpendicular directions. The devices 4 and 5 each have, as shown in FIG. 3, an electrical excitation winding 6 that is arranged to be supplied with alternating current and is wound to embrace individually two elongated ferromagnetic elements 7 and 8 of the device. The ferromagnetic elements 7 and 8 extend parallel to one another with the winding 6 wound to magnetize them in opposite senses and with an output electrical winding 9 embracing the two elements 7 and 8 conjointly. An electrical alternating current signal of twice the frequency of the excitation current is induced in the output winding 9, this signal having an amplitude that provides a measure of the magnetic field strength acting in the lengthwise direction of the elements 7 and 8. The device 4 of each unit 1 and 2 is mounted on the boom 3 with its elements 7 and 8 parallel to the longitudinal (fore-aft) axis LA of the vehicle, whereas the device 5 in each case is mounted with its elements 7 and 8 parallel to the transverse (athwartships) axis AA of the vehicle. The output signals of the devices 4 and 5 in each case, accordingly provide measures of the longitudinal and transverse components, respectively, of the local horizontal magnetic field. The output signals of the devices 4 and 5 in the unit 1 provide measures of these field components experienced at the far end of the boom 3, whereas the output signals of the devices 4 and 5 in the unit 2 provide measures of the field components experienced at the intermediate position nearer the vehicle.

The magnetic fields at the spaced positions of the units 1 and 2 differ because of the differing distances of these positions from the vehicle. The signals supplied by the devices 4 and 5 of the unit 1 are representative respectively, of:

$$H \cos \theta_m + x \quad (1)$$
$$H \sin \theta_m + y \quad (2)$$

whereas those supplied by the unit 2 are representative respectively, of:

$$H \cos \theta_m + X \quad (3)$$
$$H \sin \theta_m + Y \quad (4)$$

where:

$H$ is the local strength of the earth's horizontal magnetic field alone;

$\theta_m$ is the magnetic-heading of the vehicle (that is to say, the angle between the longitudinal axis LA of the vehicle and the local magnetic meridian);

$x$ and $y$ are respectively the strengths at the unit 1 of the longitudinal and transverse components of the magnetic field due to the vehicle itself; and $X$ and $Y$ are respectively the strengths at unit 2 of the longitudinal and transverse components of the magnetic field due to the vehicle itself.

Referring more particularly to FIG. 2, the output signal of the device 4 in the unit 2 is supplied via a potentiometer 10 to a differential amplifier 11 for subtraction from the output signal of the device 4 of the unit 1. The output signal of the device 5 in the unit 2 is likewise supplied via a potentiometer 12 to a differential amplifier 13 for subtraction from the output signal of the device 5 of the unit 1. The potentiometers 10 and 12 are both set so as to reduce the amplitude of the relevant output signal of the unit 2 by a fractional factor, the factor in the case of the potentiometer 10 being $(x/X)$, and in the case of the potentiometer 12 being $(y/Y)$. The resultant difference-signals accordingly supplied by the amplifiers 11 and 13 are, respectively:

$$H(1-x/X) \cos \theta_m \quad (5)$$
$$H(1-y/Y) \sin \theta_m \quad (6)$$

In the present instance, the factor $(x/X)$ is for practical purposes equal to the factor $(y/Y)$, and it is therefore satisfactory for the settings of the potentiometers 10 and 12 to be made by means of a common manual control 14. Accordingly, the expressions (5) and (6), upon rewriting with G equal to both $H(1-x/X)$ and $H(1-y/Y)$, are respectively of the form:

$$G \cos \theta_m \quad (7)$$
$$G \sin \theta_m \quad (8)$$

The output signals of the amplifiers 11 and 13, representative respectively of the expressions (7) and (8), are supplied to a unit 15 that effects correction for the local magnetic variation or grid variation (that is to say, for the local angular difference in azimuth between the magnetic and true meridians, or between the magnetic meridian and the grid lines). Within the unit 15, the output signal of the amplifier 11 is supplied in a fixed proportion to an amplifier 16 via a potentiometer 17, and the output signal of the amplifier 13 is supplied in the same fixed proportion to an amplifier 18 via a potentiometer 19. In addition, the output signal of the amplifier 11 is supplied via the potentiometer 17 to the amplifier 18, and the output signal of the amplifier 13 is supplied via the potentiometer 19 to the amplifier 16, both in the same selectively-variable proportion. The selectively-variable proportion, in this latter respect, is controlled by a common manual control 20 which is set in accordance with (tan $M$), where $M$ is the appropriate angular value of the magnetic or grid variation. The two signals supplied to the amplifier 16 are combined additively therein to provide a sum proportional to:

$$\cos \theta_m - \sin \theta_m \tan M$$

so that the output signal from the amplifier 16 is representative of:

$$K \cos (\theta_m + M)$$

that is to say, of:

$$K \cos \theta \quad (9)$$

where:

$\theta$ is the true heading of the vehicle; and
$K$ is inversely proportional to $(\cos M)$.

The two signals supplied to the amplifier 18, on the other hand, are combined therein to provide a sum proportional to:

$$\sin \theta_m + \cos \theta_m \tan M$$

so that the output signal from the amplifier 18 is representative of:

$$K \sin (\theta_m + M)$$

that is to say, of:

$$K \sin \theta \quad (10)$$

The two signals representative of expressions (9) and (10) are used to provide an indication of the true or grid heading-angle $\theta$ of the vehicle, and also indications of the distances travelled in terms of northings and eastings. An indication of the heading-angle $\theta$ is provided by a compass indicator 21 that is driven by a two-phase synchro torque receiver 22, the output signals of the amplifiers 16 and 18 being suplied to the synchro-receiver 22 via amplifiers 23 and 24 respectively. (If a very high degree of precision is required, the synchro-receiver 22 and indicator 21 may be replaced by a synchro-resolver and an electrical zero-indicator responsive to any signal induced in the rotor winding of the resolver, the signals from the amplifiers 16 and 18 being supplied to the mutually-perpendicular stator windings of the resolver; the angular position of the rotor is set manually to obtain zero-signal induced in the rotor winding so that the angular setting of the rotor in these circumstances indicates the heading-angle.)

The output signals of the amplifiers 16 and 18 are supplied to a distance computer 25 together with a signal which is representative of the forward velocity V of the vehicle. This latter signal is derived in the present instance by a pick-off 26 coupled to the transmission of the vehicle. The computer 25 in acordance with the three signals supplied to it, provides a digital indication of the appropriate northing on a digital indicator 27, and a digital indication of the appropriate easting on a digital indicator 28. The construction and operation of the computer 25 will now be described with reference to FIG. 4.

Referring to FIG. 4, the output signals of the amplifiers 16 and 18 are supplied in the computer 25 to gain-controlled amplifiers 30 and 31 respectively. The output signals of the amplifiers 30 and 31, respresentative of expressions (9) and (10) each multiplied by the common, controllable gain-factor A of the amplifiers 30 and 31, are supplied to respective integrators 32 and 33 that operate the digital indicators 27 and 28. These output signals are also supplied to squaring circuits 34 and 35, and the output signals of these respective circuits are supplied to an arithmetic unit 36 that subtracts each of them from an output signal of a further squaring circuit 37. The squaring circuit 37 receives in the computer 25 the signal representative of the forward velocity V of the vehicle as supplied by the pick-off 26, and the arithmetic unit 36 accordingly derives a signal representative of:

$$V^2 - K^2 A^2 (\cos^2 \theta + \sin^2 \theta)$$

that is to say, of:

$$V^2 - K^2 A^2$$

This signal is supplied to control the gain A of each of the amplifiers 30 and 31 in such a manner as to reduce this signal to zero and thereby ensure that the signals supplied to the integrators 32 and 33 are respectively representative of:

$$V \cos \theta \qquad (11)$$

and $$V \sin \theta \qquad (12)$$

The integrators 32 and 33 integrate these signals with respect to time, and operate the digital indicators 27 and 28 in accordance with the resultant integrals, so as thereby to provide the relevant indications of northing and easting.

The computer 25 may alternatively have the form shown in FIG. 5.

Referring to FIG. 5, the output signals of the amplifiers 16 and 18, representative respectively of expressions (9) and (10), are received in the computer 25 by input circuits 40 and 41. Each circuit 40 and 41 acts both as a phase detector and a rectifier to derive two output signals; a first of the output signals, being derived in dependence upon the phasing of the received signal, is representative of the sign of the relevant expression, and the second, being derived by a process involving rectification, is representative of the modulus of that expression.

The said first output signal of the circuit 40 is supplied to an integrator 42. The integrator 42 controls the digital indicator 27 in accordance with the integral with respect to time of the signal representative of forward speed V, this signal being supplied to the integrator 42 from the pick-off 26 via a switch 43. Each increment in the integration process is ascribed the sign represented by the said first output signal supplied from the circuit 40 to the integrator 42.

The said second output signal of the circuit 40 is supplied through a switch 44 to an integrator 45, and also to a summing amplifier 46 that controls operation of the switches 43 and 44. The amplifier 46 compares the signal it receives from the circuit 40 with the output signal of an integrator 47 that integrates with respect to time a predetermined constant voltage that is supplied within the integrator 47. When, with the passage of time, the output signal of the integrator 47 reaches equality with the signal received from the circuit 40, the output signal of the amplifier 46 falls to zero. This causes both switches 43 and 44 to open and thereby breaks the supply to the integrator 42 of the signal from the pick-off 26 and the supply to the integrator 45 of the second output signal of the circuit 40.

The two output signals of the circuit 41 are utilized in a similar manner to those of the circuit 40. The said first output signal of the circuit 41 is supplied to an integrator 48 to control the sign of each increment of an integration process performed by the integrator 48. The integrator 48 controls the digital indicator 28 in accordance with the integral with respect to time of the signal representative of forward speed V, this signal being supplied to the integrator 48 from the pick-off 26 via a switch 49. The said second output signal of the circuit 41 is supplied through a switch 50 to the integrator 45 and also to a summing amplifier 51 that controls operation of the switches 49 and 50. The amplifier 51 compares the signal it receives from the circuit 41 with the output signal of the integrator 47, and when there is equality between them its output signal falls to zero. This causes both switches 49 and 50 to open and thereby breaks the supply to the integrator 48 of the signal from the pick-off 26 and the supply to the integrator 45 of the second output signal of the circuit 41.

The output signal of the integrator 47, in addition to being supplied to the amplifiers 46 and 51, is supplied to the integrator 45 in opposition to the two signals supplied via the switches 44 and 50. Thus, after the two switches 44 and 50 have both opened, the integral with respect to time provided by the integrator 45 is reduced progressively to zero. A zero-detector 52 is responsive to the condition in which the integral of the integrator 45 becomes zero, to reset the integrator 47 to zero.

When the integrator 47 is reset to zero, the switches 43, 44, 49 and 50 again close under control of the amplifiers 46 and 51. The switches 43 and 44 are then opened again after the period of time, proportional to (cos $\theta$), required for the integral provided by the integrator 47 to reach equality with expression (9). The integral accumulated in this period by the integrator 42 accordingly provides a measure of the integral with respect to time of expression (11). The indicator 27, which is up-dated in accordance with this integral, thereby provides the required indication of the appropriate northing. Similarly, the switches 49 and 50 are opened again after the period of time, proportional to (sin $\theta$), required for the integral provided by the integrator 47 to reach equality with expression (10). The integral accumulated in this period by the integrator 48, accordingly provides a measure of the integral with respect to time of expression (12). The indicator 28, which is up-dated in accordance with this integral, thereby provides the required indication of the appropriate easting.

The full integral accumulated by the integrator 45 in respect only of the two signals supplied through the switches 44 and 50 is equivalent to:

$$\cos^2 \theta + \sin^2 \theta$$

that is to say, to unity. When the integral with respect to time of the output signal of the integrator 47 has reached this value, the resultant integral provided by the integrator 45 is zero. The response of the zero-detector 52 to this, resets the integrator 47 to initiate another of a series of successive integrating cycles, the indications of northing and easting provided by the indicators 27 and 28 being appropriately up-dated during each successive cycle.

It is necessary with the computer of FIG. 5 to ensure that the integrator 47 is reset to zero rapidly. In order to meet this requirement it may be arranged that two capacitors are used for the integration process during alternate integration cycles. Furthermore, it is desirable to ensure that the integral of the integrator 45 is reduced to zero only after the switches 44 and 50 have both been opened. To this end, the output signal of the integrator 47 may be supplied to the integrator 45 via a potentiometer so as to modify the time-scale and reduce the rate of accumulation of the integral of this signal within the integrator 45. Additionally, it may be arranged that the integrator 47 is reset only in response to the combined circumstances in which the zero-detector 52 emits a signal and both the switches 44 and 50 are open.

In a modification of the computer shown in FIG. 5, the indicators 27 and 28 are driven mechanically by respective electrical stepping-motors that replace the integrators 42 and 48. The pick-off 26 in these circumstances supplies pulses at a recurrence rate representative of the forward velocity V, and these pulses supplied to either motor via the relevant switch 43 or 49 each cause the motor to rotate one step. The rotation is forward or backward in dependence upon the sign of the increment as represented by the said first signal from the appropriate input circuit 40 or 41.

Provision may be made for applying a selectively-variable magnetic field at either or both of the two positions on the boom 3, in order to reduce the magnetic deviation resulting from the vehicle itself. In particular, each devices 4 and 5 of the unit 1 may include, as shown in FIG. 3, a further electrical winding 60 wound on an elongated ferromagnetic core 61 parallel to the cores 7 and 8. Direct current is supplied to the winding 60 to produce a magnetic bias of the appropriate magnitude and sense. As indicated in FIG. 2, direct currents may be supplied to the windings 60 of the devices 4 and 5 in the unit 1 from separate potentiometers 62 and 63, individual adjustments of the longitudinal and transverse components of deviation being made simply by adjustments to the settings of manual controls 64 and 65 of the potentiometers 62 and 63.

As an alternative, correction for the deviation resulting from the vehicle itself may be made by deriving an alternating current signal of the same frequency as the signals supplied by the flux-valve devices 4 and 5 and applying this signal in selectively-variable proportions to the two amplifiers 11 and 13 of FIG. 2. In certain circumstances, however, it may be found that adequate correction can be made simply by slight tilting of the fluxvalves 4 and 5 along their respective axes of measurement. Small angular adjustments of the flux-valves 4 and 5 may also be used to correct, for example, for asymmetry in the location of soft-iron components in the vehicle.

Although the magnetic detectors 1 and 2 described above with reference to FIGS. 1 to 3, are each of a form involving just two devices 4 and 5 arranged mutually perpendicular in azimuth, magnetic detectors involving, for example, three flux-valve devices equally angularly-spaced from one another in azimuth, may be used instead. In these latter circumstances it may be arranged that signals comparable with those supplied directly by the devices 4 and 5 are derived by means of transformers from the signals applied by three devices. Alternatively, one of the three devices may be conveniently aligned with either the longitudinal or transverse axis, and then the signals supplied by the other two devices can be combined in opposition to one another to produce, after attenuation by a factor of 1.7321, a resultant signal appropriate to the other axis.

In the case of the system described above, the factor $(x/X)$ is for practical purposes equal to the factor $(y/Y)$. If this were not so, then the desired signals representative of expressions (7) and (8) could be derived by supplying the signals from the amplifiers 11 and 13 via additional potentiometers. These additional potentiometers, which may be appropriately ganged to the potentiometers 10 and 12, are set such that the magnitude of the signal representative of expression (5) is multiplied by the factor $(1-y/Y)$ and the magnitude of the signal representative of expression (6) is multiplied by the factor $(1-x/X)$. Alternatively, one or the other of the output signals from the amplifiers 11 and 13 can be attenuated or amplified in the ratio of $(1-y/Y)$ to $(1-x/X)$, or in accordance with difference in the settings of the potentiometers 10 and 12.

The variation-correction unit 15, rather than having the form described with reference to FIG. 2, may simply involve a resolver having a pair of mutually-perpendicular rotor windings that are rotatable with respect to a pair of mutually-perpendicular stator windings. In these circumstances the rotor of the resolver is set to an angular position with respect to the stator dependent upon the angle M, and the output signals of the amplifiers 11 and 13 are supplied to the windings of one pair; the output signals of the unit 15 are then taken from the windings of the other pair.

The operation of the navigation apparatus described above with reference to FIG. 2 can be readily checked. For example, when the form of computer 25 described with reference to FIG. 5 is used, the operation of the major parts of the apparatus can be checked simply by injecting a signal in place of the signal from the pick-off 26, and by then varying the setting of the control 20 to enter this signal selectively into either integrator 42 or 48.

I claim:

1. Navigation apparatus for use with a craft, comprising a plurality of spaced magnetic detectors for sensing respectively at different locations relative to the craft the earth's magnetic field as differently modified at those locations by the craft, means for deriving from each detector at least two signals that are in accordance respectively with different components of the field sensed by the individual detector, a first of the two signals being derived in each case in accordance with the component of field parallel to a first of two mutually-inclined exes defined with respect to the detectors, and the second signal being derived in each case in accordance with the component of field parallel to the second axis, first means for comparing with one another said first signals derived from the different detectors to provide an output representation in accordance with the component of undeviated field along said first axis, second means for comparing with one another said second signals derived from the different detectors to provide an output representation in accordance with the component of undeviated field along said second axis, speed-sensing means for providing a signal dependent upon velocity of the craft, and computing means responsive jointly to the velocity-signal and the two representations provided by said first and second comparison means to compute distances traveled by the craft in terms of northing and easting.

2. Navigation apparatus according to claim 1 including a non-ferromagnetic boom, said magnetic detectors being carried by the boom at positions spaced from one another along its length.

3. Navigation apparatus according to claim 1 wherein the first and second axes are mutually-perpendicular axes.

4. Navigation apparatus according to claim 1 including means for providing a representation of magnetic heading of the craft in accordance with the output representations provided by said first and second comparison means.

5. Navigation apparatus according to claim 1 including variation-correction means responsive to said representations provided by said first and second comparison means for deriving two signals dependent respectively upon said components of undeviated magnetic fields corrected for local magnetic-variation, and wherein said computing means comprises two variable-gain amplifiers for amplifying respectively the two signals derived by said variation-correction means, two integrators for integrating with respect to time the output-signals of the two amplifiers respectively, and means respsonsive to said signal dependent upon craft-velocity for controlling the gains of said amplifiers such that the output signals of the amplifiers are representative respectively of northerly and easterly components of the craft-velocity.

6. Navigation apparatus according to claim 1 including variation-correction means responsive to said representations provided by said first and second comparison means for deriving two signals dependent respectively upon said components of undeviated magnetic field corrected for local magnetic-variation, and wherein said computing means comprises two integrators, two switches associated with the two integrators respectively, each said switch being selectively operable for supplying said signal dependent upon craft-velocity to its respectively-associated integrator, and a timing arrangement for operating the two switches for periods of time dependent respectively upon said signals derived by said variation-correction means.

7. Navigation apparatus for a craft, comprising a plurality of first magnetic-detector devices spaced apart from one another for sensing the earth's magnetic field as subjected to deviation by the craft, said first magnetic-detector devices sensing respectively the magnitudes at their spaced locations of the component of the deviated field acting parallel to a first of two mutually-inclined craft-axes, a plurality of second magnetic-detector devices spaced apart from one another for sensing respectively the magnitudes at their spaced locations of the component of the deviated field acting parallel to the second of the two axes, means for deriving from each said magnetic-detector device an electric signal in accordance with the magnitude of deviated-field component sensed by that individual device, first circuit means responsive to the signals derived from said first magnetic-detector devices to provide a signal in accordance with the component of undeviated field acting parallel to said first axis, second circuit means responsive to the signals derived from said second magnetic-detector devices to provide a signal in accordance with the component of undeviated field acting parallel to said second axis, and variation-correction means responsive to the two component-signals provided by said first and second circuit means to derive therefrom two output signals representative respectively of the said components of undeviated field corrected for local magnetic-variation, said variation-correction means comprising a selectively-adjustable device settable in dependence upon local magnetic-variation, a first signal-combining circuit responsive to the setting of said selectively-adjustable device to derive a first of said output signals in accordance with the difference between a first of said component-signals and the product with the second of said component-signals of a factor dependent upon the setting of said selectively-adjustable device, and a second signal-combining circuit responsive to the setting of said selectively-adjustable device to derive the second of said output signals in accordance with the sum of said second component-signal and the product with said first component-signal of said factor.

8. Navigation apparatus carried by a craft, comprising a first pair of magnetic-detector devices carried by the craft and spaced apart from one another for sensing the earth's magnetic field as subjected to deviation by the craft, said first pair of magnetic-detector devices sensing respectively the magnitudes at their spaced locations of the component of the deviated field acting parallel to a first of two mutually-perpendicular axes defined in the craft, a second pair of magnetic-detector devices carried by the craft and spaced apart from one another for sensing respectively the magnitudes at their spaced locations of the components of the deviated field acting parallel to the second of the two craft-axes, means for deriving from each said magnetic-detector device an electric signal in accordance with the magnitude of deviated-field component sensed by that individual detector device, first circuit means responsive to the two signals derived from said first pair of magnetic-detector devices to provide an output signal in accordance with the component of undeviated field acting parallel to said first craft-axis, and second circuit means responsive to the two signals derived from said second pair of magnetic-detector devices to provide an output signal in accordance with the component of undeviated field acting parallel to said second craft-axis, said first and second circuit means each comprising means for effecting a predetermined modification in the ratio to one another of the two signals derived from the respective pair of magnetic-detector devices, and means responsive to the two ratio-modified signals to derive the output signal of the circuit means in accordance with the difference between them.

9. Navigation apparatus according to claim 8 wherein said first and second axes are the fore-aft and athwartships axes of the craft.

10. Navigation apparatus for a craft, comprising a plurality of first magnetic-detector devices spaced apart from one another for sensing the earth's magnetic field as subjected to deviation by the craft, the said first magnetic-detector devices sensing respectively the magnitudes at their spaced locations of the component of the deviated field acting parallel to a first of two mutually-inclined craft-axes, a plurality of second magnetic-detector devices spaced apart from one another for sensing respectively the magnitudes at their spaced locations of the component of the deviated field acting parallel to the second of the two axes, means for deriving from each said magnetic-detector device an electric signal in accordance with the magnitude of deviated-field component sensed by that individual device, first circuit means responsive to the signals derived from said first magnetic-detector devices to provide a signal in accordance with the component of undeviated field acting parallel to said first axis, second circuit means responsive to the signals derived from said second magnetic-detector devices to provide a signal in accordance with the component of undeviated acting field parallel to said second axis, speed-sensing means for providing a signal dependent upon velocity of the craft, and computing means responsive jointly to the velocity-signal and the two signals provided by said first and second circuit means to compute components of the distance traveled by the craft along earth-defined axes.

11. Navigation apparatus according to claim 10 wherein said computing means comprises two variable-gain amplifiers for amplifying respectively the two signals provided by said first and second circuit means, two integrators for integrating with respect to time the output signals of the two amplifiers respectvely, and means responsive to said signal dependent upon craft-velocity for controlling the gains of said amplifiers such that the output signals of the amplifiers are representative respectively of components of the craft-velocity along said earth-defined axes.

12. Navigation apparatus according to claim 10 wherein said computing means comprises two integrators, two switches associated with the two integrators respectively, each said switch being selectively operable for supplying said signal dependent upon craft-velocity to its respectively-associated integrator, and a timing arrangement for operating the two switches for periods of time dependent respectively upon the two signals provided by said first and second circuit means.

References Cited

UNITED STATES PATENTS

| 1,592,553 | 7/1926 | Brewerton. | |
| 2,393,670 | 1/1946 | White. | |
| 2,671,275 | 3/1954 | Burns | 33—204.43 |
| 3,002,282 | 10/1961 | Rumrill | 33—141.5 |
| 3,183,603 | 5/1965 | Trenchard | 33—224 |
| 3,253,342 | 5/1966 | Depp | 33—224 |
| 3,355,942 | 12/1967 | Freeman | 73—178 |

FOREIGN PATENTS

| 775,440 | 5/1957 | Great Britain. |

ROBERT B. HULL, Primary Examiner

U.S. Cl. X.R.

33—225